US006448670B1

(12) United States Patent
Onodera et al.

(10) Patent No.: US 6,448,670 B1
(45) Date of Patent: Sep. 10, 2002

(54) SIGNAL INPUT DEVICE

(75) Inventors: Mikio Onodera; Hidetaka Numata; Katsuya Mitsuzuka, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/309,759

(22) Filed: May 11, 1999

(30) Foreign Application Priority Data

May 12, 1998 (JP) .......................................... 10-128820
May 25, 1998 (JP) .......................................... 10-143090
Jul. 14, 1998 (JP) .......................................... 10-198984

(51) Int. Cl.[7] ................................................ B60K 20/08
(52) U.S. Cl. ......................... 307/10.1; 307/9.1; 74/335; 74/469; 74/473.1; 74/473.3; 477/34; 700/56; 701/51
(58) Field of Search ................................ 307/10.1, 9.1; 74/469, 473.3, 473.1, 335, 538, 471; 477/34; 701/51, 64; 345/161, 157; 700/56, 85; 340/407.1; 341/20

(56) References Cited

U.S. PATENT DOCUMENTS 4,271,728 A * 6/1981 Wakamatsu ................ 74/473.3
4,701,629 A 10/1987 Citroën
5,339,705 A * 8/1994 Shirahama et al. ........... 74/538
5,589,828 A * 12/1996 Armstrong .................. 345/161
5,661,253 A 8/1997 Aoki
5,712,660 A 1/1998 Martin
6,067,492 A * 5/2000 Tabata et al. ................. 701/51
6,076,414 A * 6/2000 Tabata et al. ................. 74/335

FOREIGN PATENT DOCUMENTS

JP 2 731 090 A 8/1996
JP 409020153 * 1/1997
JP 09164270 6/1997

OTHER PUBLICATIONS

"Joystick With Tactile Feedback", Research Disclosure, GB, Industrial Opportunities LTD. Havant, Nov. 1987, p. 742 XP)))783669, ISSN: 0374–4353.

* cited by examiner

*Primary Examiner*—Albert W. Paladini
(74) *Attorney, Agent, or Firm*—Brinks Hofer Gilson & Lione

(57) ABSTRACT

A signal input device includes a movable operating section for inputting a desired signal by selecting the shift position thereof, a shift position detecting device for detecting the shift position of the operating section, and an indication device for giving an operator information in different modes based on a shift position signal from the shift position detecting device.

41 Claims, 16 Drawing Sheets

FIG. 25

WHEN AIR CONDITIONER IS SELECTED BY SWITCH DEVICE

| SELECTED POSITION IN GUIDE GROOVE | SELECTED FUNCTION |
|---|---|
| A | NEUTRAL |
| B | AIR BLOW POSITION |
| C | AIR BLOW DIRECTION |
| D | AIR VOLUME CONTROL |
| E | AUTOMATIC AIR CONDITIONING |
| F | FRONT DEFROSTER |
| G | TEMPERATURE CONTROL |
| H | REAR DEFROSTER |
| I | AIR BLOW DIRECTION |

FIG. 26

WHEN RADIO IS SELECTED BY SWITCH DEVICE

| SELECTED POSITION IN GUIDE GROOVE | SELECTED FUNCTION |
|---|---|
| A | NEUTRAL |
| B | TUNING (AM / FM) |
| C | VOLUME CONTROL |
| D | TUNING |
| E | SELECTION OF STATION 1 |
| F | SELECTION OF STATION 2 |
| G | SELECTION OF STATION 3 |
| H | SELECTION OF STATION 4 |
| I | SELECTION OF STATION 5 |

SIGNAL INPUT DEVICE

BACKGROUND OF THE INVENTION

1. Field of the Invention

The present invention relates to a signal input device to be mounted in, for example, a vehicle, and more particularly, to a so-called joystick type signal input device in which a desired signal can be input from a movable operating section.

The present invention also relates to a car-mounted input device in which various electronic devices mounted in a car are centrally operated by a single manual operating section, and more particularly, to a means for causing an operator to tactually know whether the operation by the manual operating section is proper or improper.

2. Description of the Related Art

Hitherto, this type of signal input device has been proposed, for example, as shown FIGS. 19 and 20. In this signal input device, a grip portion 101 of a joystick 100 has, on its peripheral surface, retractable projections 102 arranged in a dense 4 by 4 matrix, i.e., sixteen in total.

The projections 102 are disposed corresponding to portions 104, that is, the tip, middle, and base portions of the four fingers, excluding the thumb, and portions slightly close to the palm, of a hand 103 that grips the grip portion 101, as shown in FIG. 20. Although not shown, vibration means having piezoelectric elements are provided inside the projections 102, respectively, so as to individually vibrate the projections 102.

By gripping the grip portion 101 with the hand 103 and tilting the joystick 100 in a desired direction, a signal is output. Based on this output signal, a car-mounted device is operated, and the vibration means is also driven to transmit vibrations to the projections 102. This allows the driver to tactually know, through the hand 103, which of-the projections 102 is vibrating, and which car-mounted device is being presently operated.

It is difficult to operate the car-mounted device while driving a car, and to check the operation by watching a monitor display during driving. According to the above-described conventional device, the driver can tactually check the operation of the car-mounted device without watching the monitor display, and this ensures safe driving. The conventional device, however, also has some disadvantages.

That is, this joystick 100 needs a plurality of projections 102, a plurality of vibration means corresponding to the projections 102, control means for individually controlling the drives of the vibration means, and the like. This results in an increased number of components, complicated structure, large size, high cost, and troublesome assembly.

Since the size of the hand 103 for operating the joystick 100, that is, the positions of the portions 104 in FIG. 20, varies among individuals, differences arise in tactually sensing which projection 102 is vibrating, and this makes it impossible to properly check the operations of the car-mounted devices in a tactile manner.

Recent cars are equipped with a plurality of electronic devices, such as an air conditioner, a radio, a television, a CD player, and a navigation system. Since individual control of these electronic devices may hinder the driving of a car, a car-mounted input device has been proposed hitherto, in which all electronic devices can be controlled by operating a single manual operating section in order to easily turn on and off a desired electronic device, to select the function of the device, and to control the selected function, while maintaining safe driving.

FIGS. 21 to 26 show the configuration of a car-mounted input device as a second conventional art. FIG. 21 is an interior view of a car equipped with the car-mounted input device, FIG. 22 is a side view of the car-mounted input device, FIG. 23 is a plan view of a manual operating section included in the car-mounted input device, FIG. 24 is a plan view of a guide plate included in the car-mounted input device, FIG. 25 is a table showing the relationship between the engaging position of an engaging pin in a guide groove and the function to be selected, when an air conditioner is selected by a switch device, and FIG. 26 is a table showing the relationship between the engaging position of the engaging pin in the guide groove and the function to be selected, when a radio is selected by the switch device.

Referring to FIG. 21, a car-mounted input device 200 as the second conventional art is mounted in a console box 300 between a driver's seat and a front passenger's seat in the car.

As shown in FIGS. 22 to 24, the car-mounted input device 200 mainly comprises a manual operating section 210 including two click switches 211 and 212 and three rotary variable resistors 213, 214, and 215 that serve as signal input means; an X-Y table 220 to be driven in the X-direction and the Y-direction orthogonal to each other by the manual operating section 210; a stick controller 230 serving as a position signal input means that inputs a signal in accordance with the direction and amount of movement of the X-Y table 220; and a guide plate 240 engaged with the manual operating section 210 via the X-Y table 220.

The manual operating section 210 and the X-Y table 220 are connected via a connecting shaft 250, and the X-Y table 220 and the guide plate 240 are connected by movably fitting the leading end of an engaging pin 260, which projects from the lower surface of the X-Y table 220, in a guide groove 241 cut in the upper surface of the guide plate 240. The guide groove 241 is, as shown in FIG. 24, constituted by three longitudinal grooves 241*a*, 241*b*, and 241*a* arranged at regular intervals, and a transverse groove 241*d* for connecting the centers of these three longitudinal grooves 241*a*, 241*b*, and 241*c*. The grooves 241*a* to 241*d* have such a width that the engaging pin 260 can move only in the longitudinal directions thereof. Therefore, the manual operating section 210 and the X-Y table 220 can move only in the X-direction (the lengthwise direction of the transverse groove 241*d*) and the Y-direction (the lengthwise direction of the longitudinal grooves 241*a* to 241*a*) within the pattern and the size of the guide groove 241.

The functions of car-mounted electronic devices can be switched by moving the engaging pin 260 to any-of the ends and centers A to I of the longitudinal grooves 241*a*, 241*b*, and 241*a* shown in FIG. 24, and operating one of the two click switches 211 and 212 in the manual operating section 210. That is, this causes the stick controller 230 to output position information about the position of engagement between the engaging pin 260 and the guide groove 241 which is selected by operating the manual operating section 210 and the X-Y table 220, and therefore, it is possible to select the function of the car-mounted electronic devices based on the position signal.

The function of the electronic device, which is selected by operating the manual operating section 210 and the click switch 211 or 212, can be controlled by operating any of the three rotary variable resistors 213, 214, and 215 provided in the manual operating section 210.

The car-mounted input device 200 having the above-described configuration centrally controls a plurality of car-mounted electronic devices, in combination with a switch device for alternatively selecting desired one from the electronic devices, a display device for displaying the name of the electronic device selected by the switch device, and details of operations of the car-mounted input device 200, and a computer for controlling these devices.

As shown in FIG. 21, a switch device 270 including a combination of a plurality of (five in FIG. 21) switches 271 a to 271 e is provided near the car-mounted input device 200 in the console box 300, and a display device 280, such as a liquid crystal display device, is. provided in a portion. of the console box 300 that can be easily seen from the driver's seat. Since a computer is placed inside the console box 300, the illustration thereof is omitted.

The switches 271*a* to 271*e* in the switch device 270 are connected to the car-mounted electronic devices, respectively. For example, when it is assumed that the switches 271*a,* 271*b,* 271*c,* 271*d,* and 271*e* are respectively connected to an air conditioner, a radio, a television, a CD player, and a navigation system mounted in the car, the air conditioner can be alternatively selected by operating the switch 271*a,* and the radio can be alternatively selected by operating the switch 271*b*. This also applies to the other electronic devices. Therefore, it is possible to power a desired electronic device on or off by operating one of the switches 271*a* to 271*e* in the switch device 270.

The functions of the electronic device selected by the switch device 270 can be selected and controlled by operating the car-mounted input device 200. The functions to be selected by the car-mounted input device 200 vary according to the kind of the selected electronic device. For example, when the air conditioner is selected by the switch device 270, the engaging positions A to I of the engaging pin 260 in the guide groove 241 shown in FIG. 24 and the functions to be selected have a relationship shown in FIG. 25. When the radio is selected by the switch device 270, the engaging positions A to I and the functions to be selected have the relationship shown in FIG. 26.

On the other hand, the functions to be controlled by. the car-mounted input device 200 vary according to the kind and function of the selected electronic device. For example, when the air conditioner is selected by the switch device 270 and "air volume control" is selected by the manual operating section 210, the volume of air from the air conditioner can be controlled by operating the first rotary variable resistor 213. When the air conditioner is selected by the switch device 270 and "temperature control" is selected by the manual operating section 210, the set temperature of the air conditioner can be controlled by operating the second rotary variable resistor 214. In contrast, when the radio is selected by the switch device 270 and the "volume control" is selected by the manual operating section 210, the sound volume of the radio can be controlled by operating the first rotary variable resistor 213. When the radio is selected by the switch device 270 and "tuning" is selected by the manual operating section 210, the radio can be tuned by operating the second variable resistor 214.

Since the car-mounted input device 200 is operated even during driving of the car, it is preferable, for the purpose of safe driving and convenient use, to tactually confirm whether the manual operating section 210 has been switched to the position corresponding to a desired function.

Since the car-mounted input device 200 does not have such capabilities, however, the operating position of the manual operating section 210 or the display on the display device 280 must be visually checked.

SUMMARY OF THE INVENTION

The present invention has been made to solve the above-described problems of the conventional arts, and it is accordingly an object of the present invention to provide a signal input device, in which the operation performed by an operating section can be tactually grasped with precision, and which achieves a small number of components, simple structure, small size, reduced cost, simple assembly, and high operability.

In order to achieve the above object, according to an aspect of the present invention, there is provided a signal input device-including a movable operating section for inputting a desired signal by selecting the shift position thereof, a shift position detecting means (e.g., a membrane switch) for detecting the shift position of the operating section, an indication means (e.g., a vibration means such as a solenoid, or a sound producing means such as a speaker) for giving information in different modes (e.g., different vibration or sound modes) to an operator based on a shift position signal from the shift position detecting means.

The operating section, such as a grip portion of a control lever, may have a plurality of vibrations means, e.g., piezoelectric vibrators, and the time-varying vibration point shift mode produced by the plurality of vibration means varies depending on the shift position of the operating section.

Since the indication means can produce information, such as different vibrations and sound modes, based on a tilting position signal that serves as a shift position signal of the operating section, it is satisfactory that at least one indication means is provided. This reduces the number of components, compared with the conventional arts, and thereby achieves simple structure, small size, low cost, and simple assembly.

The indication means does not respond to the tip or middle portion of a finger, as is different from the conventional arts, and, for example, vibrates the entire grip portion of the control lever serving as the operating section. Therefore, it is possible to precisely grasp the operation performed by the operating sections regardless of the size of the hand.

According to another aspect of the present invention, there is provided a car-mounted input device including a manual operating section having one or more signal input means, a position signal input means for inputting a signal in accordance with the position of the manual operating section, a guide means for limiting the moving range of the manual operating section and an X-Y table, and a vibration means disposed inside the manual operating section so as to produce vibrations in the mode that varies depending on the operating position of the manual operating section with respect to the guide means.

When an engaging pin is positioned at any point in a guide groove formed in the guide means by operating the manual operating section, and a click switch provided in the manual operating section is operated, a position signal in accordance with the engaging position of the guide groove and the engaging pin is input from the position signal input means, such as a stick controller, to a control section. The control section outputs a drive signal for the vibration means in response to the input position signal, thereby vibrating the vibration means in the mode in accordance with the drive signal.

Since the vibration means is thus provided inside the manual operating section so as to produce vibrations in the mode that varies depending on the operating position of the manual operating section, the driver can tactually determine whether the operating position of the manual operating section coincides with a desired position, based on the difference of the mode of vibrations transmitted to the hand via a casing of the manual operating section. This further improves operability and convenience of use of the car-mounted input device.

Further objects, features, and advantages of the present invention will become apparent from the following description of the preferred embodiments with reference to the attached drawings.

BRIEF DESCRIPTION OF THE DRAWINGS

FIG. 25 is a table showing the relationship between the engaging position of an engaging pin in a guide groove and the function when an air conditioner is selected by a switch device.

FIG. 26 is a table showing the relationship between the engaging position of the engaging pin in the guide groove and the function when a radio is selected by the switch device.

DESCRIPTION OF THE PREFERRED EMBODIMENTS

Figure 1:
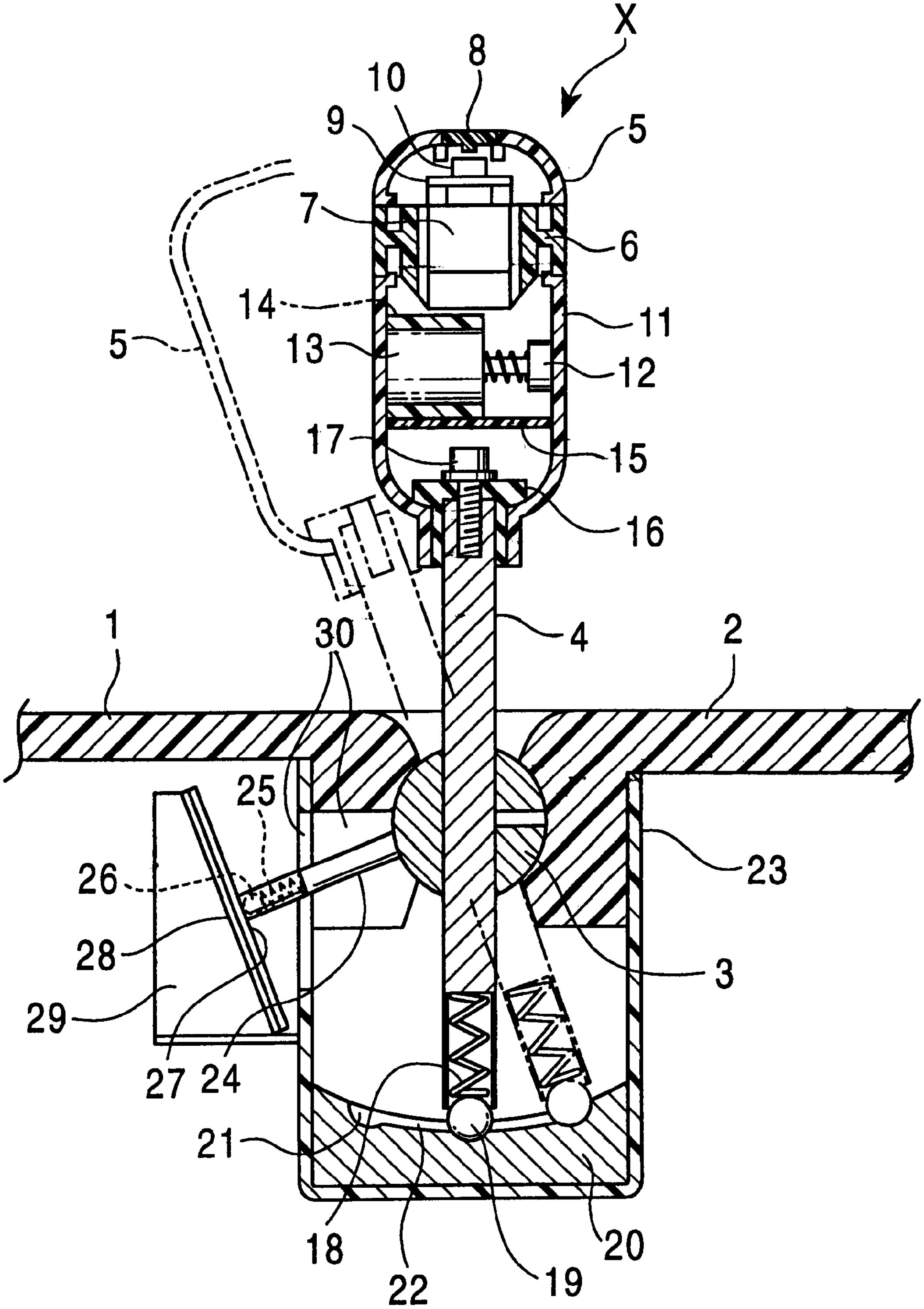
FIG. 1 is a cross-sectional view of a signal input device according to a first embodiment of the present invention.

Embodiments of the present invention will be described below with reference to the attached drawings. FIG. 1 is a sectional view of a signal input device of a joystick type according to a first embodiment of the present invention, which is used to operate, for example, a car audio system, a car air conditioner, and a car navigation system.

Referring to FIG. 1, a spherical member 3 is rotatably supported in the center of a cylindrical receiving portion 2 formed in a housing 1. A lever shaft 4 serving as an operation shaft penetrates through the spherical member 3. The upper part of the lever shaft 4 projects from the housing 1, and the head thereof is provided with a grip portion 5.

A rotary knob 6 is provided on the peripheral surface of the grip portion 5, and is connected to a potentiometer type switch 7 built in the grip portion 5. While the potentiometer type switch 7 is used in this embodiment, a general type of potentiometer may be used instead. At the top of the grip portion 5, a switch cap 8 is provided to be connected to a push switch 10 mounted on a substrate 9.

A cover 11 that forms the peripheral wall of the grip portion 5 is formed of a mold of synthetic resin having small elasticity. A vibration head 12 is in contact with the inside of the cover 11, and is connected to a solenoid 13. While the vibration head 12 and the solenoid 13 are adopted as a vibration means in this embodiment, a piezoelectric element may be used instead. The solenoid 13 is mounted on a plate 15 via a solenoid holder 14.

A vibration absorbing member 16, which is made of rubber, soft synthetic resin, or the like, is interposed between the grip portion 5 and the lever shaft 4 so that vibrations of the grip portion 5 are not transmitted to the lever shaft 4. The grip portion 5 is fixed to the lever shaft 4 by a bolt 17 via the vibration absorbing member 16.

At the bottom end of the lever shaft 4, a ball 19 is retractably supported via a coil spring 18 so as to move on a guide base 20.

Figure 2:
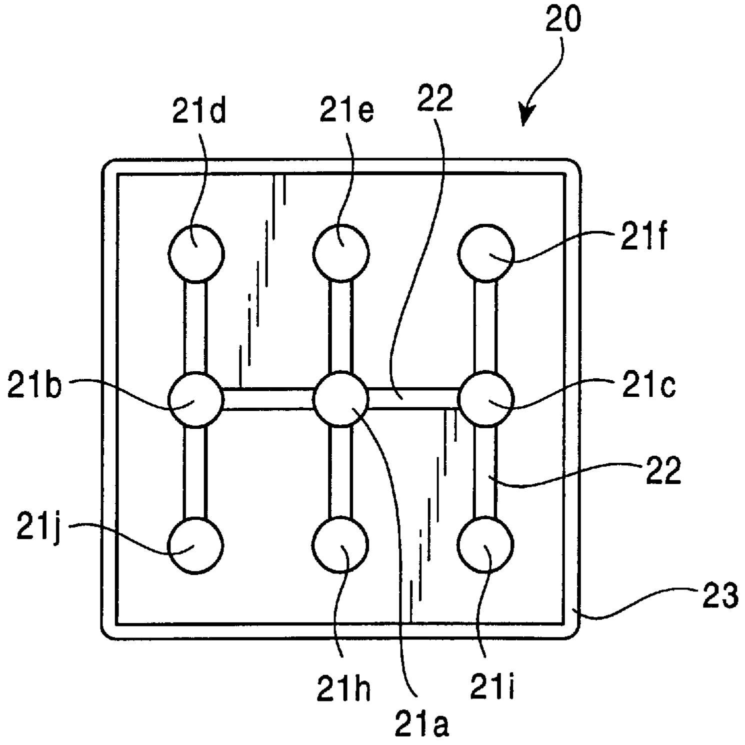
FIG. 2 is a plan view of a guide base in the signal input device.

The surface of the guide base 20 is recessed in the form of a circular arc, and nine semispherical position holes 21*a* to 21*i* are formed thereon at predetermined intervals, as shown in FIG. 2. The position holes 21*a* to 21*i* communicate with one another via shallow guide grooves 22. As shown in FIG. 1, the guide base 20 is mounted in a box-shaped holding member 23 below the receiving portion 2.

The spherical member 3, the lever shaft 4, and the grip portion 5 constitute an operating section X. By pivoting the operating section X on the spherical member 3, the ball 19 is elastically fitted in any of the position holes 21, thereby maintaining the operating section X in the shifted state.

Figure 3:
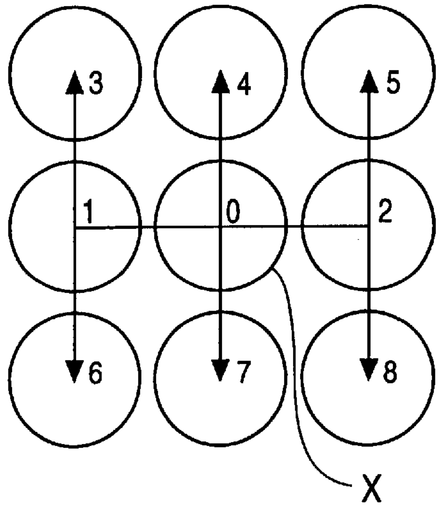
FIG. 3 is an explanatory diagram showing operating positions of an operating section in the signal input device.

FIG. 3 shows the operating positions and directions of the operating section X. Nine operating positions, No. 0 to No. 8, are arranged in a matrix corresponding to the position holes 21*a* to 21*i* on the guide base 20 shown in FIG. 2. The position No. 0 serves as the neutral position of the operating section X. For example, when the operating section X is shifted from the position No. 0 as the neutral position to the position No. 3, it is moved to the position No. 3 via the position No. 1 (No. 0→No. 1→No. 3 ), as shown by the arrow of FIG. 3.

A rod 24 projects from the spherical member 3, and a ball 26 is retractably supported at the leading end thereof via a coil spring 24. The ball 26 is in pressure contact with a ground point switch 27 that is a kind of membrane switch. The ground point switch 27 is supported on a substrate 28 that is attached to the holding member 23 via a bracket 29. Since the rod 24 pivots on the spherical member 3 with the movement of the operating section X, large cutout portions 30 are formed in the receiving portion 2 and the holding member 23, respectively, so as to allow the pivotal movement.

When the operating section X is shifted in a desired position, the rod 24 also moves, so that the position of the ball 26 on the X-Y coordinates of the ground point switch 27 is changed, and a position signal is output from the ground point switch 27. While the rod 24, the ball 26, and the ground point switch 27 constitute a shift position detecting means for detecting the shift position of the operating section X in this embodiment, such a mechanical position detecting means may be replaced with an optical position detecting means.

Figure 4:
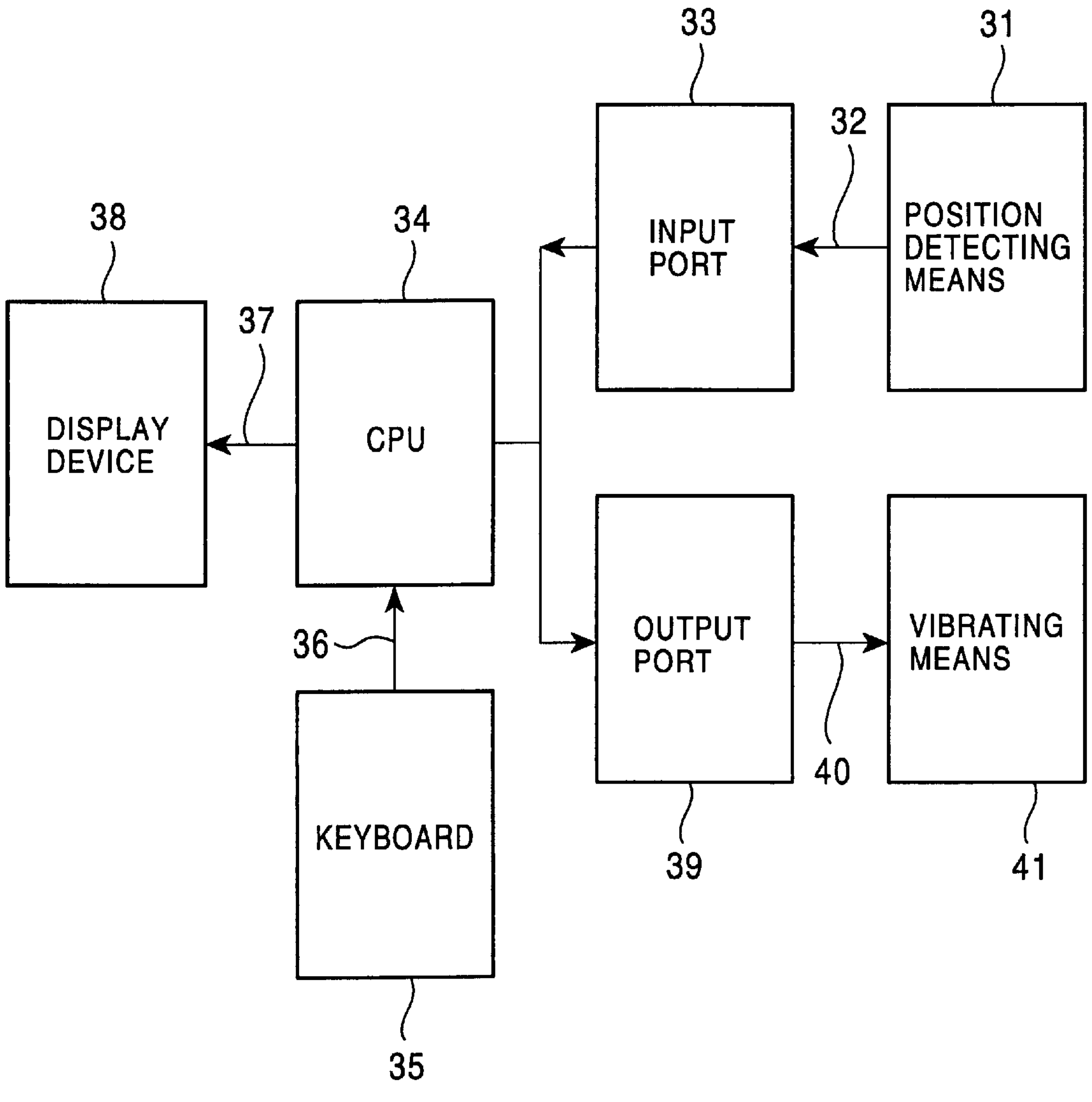
FIG. 4 is a block diagram of a control section in the signal device.
Figure 5A:
FIGS. 5A to 5J are waveform charts of pulses to be supplied to a vibration means in the signal input device.
Figure 5B:
Figure 5C:
Figure 5D:
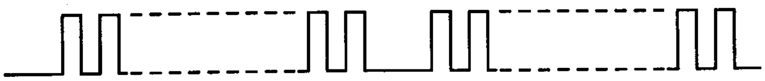
Figure 5E:
Figure 5F:
Figure 5G:
Figure 5H:
Figure 5I:
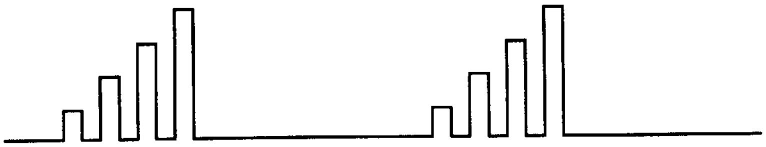
Figure 5J:
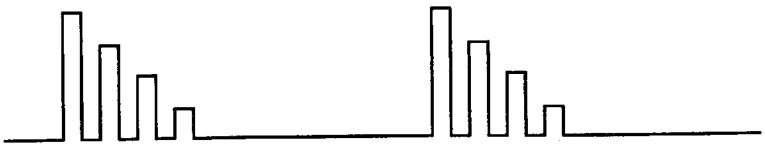

FIG. 4 shows an example of a control section. As shown in FIG. 4, a position detecting signal 32 from the shift position detecting means (constituted by the rod 25, the ball 26, and the ground point switch 27) for detecting the shift position of the operating section X is input to a CPU (central processing unit) 34 via an input port 33. A selection signal 36 from a keyboard switch 35 is also input to the CPU 34. Based on the selection signal 36 and the position detecting signal 32 thus input, a display signal 37 is output from the CPU 34 to a display device 38 formed of a display, where information about the operation of car-mounted devices is displayed.

A vibration signal 40 is input from the CPU 34 to a vibration means 41 (constituted by the vibration head 12 and the solenoid 13) via an output port 39, thereby obtaining a vibration mode according to the vibration signal 40.

FIGS. 5A to 5J show examples of waveforms of pulses to be supplied to the solenoid 13 that serves as a vibration source in the vibration means 41. In the example shown in FIG. 5A, a pulse is cyclically applied to the solenoid 13 so that a vibration is cyclically applied to the finger middle portions of the hand of an operator that is gripping the operating section X. In the example shown in FIG. 5B, two pulses are cyclically applied so that two vibrations are cyclically applied. In the example shown in FIG. 5C, three vibrations are cyclically applied. The vibration frequency can be gradually increased in this way, and for example, it can be preset in accordance with the shift positions of the operating section X shown in FIG. 3. In the example shown in FIG. 5D, a plurality of pulses are applied for a predetermined time so that vibrations are continuously applied during this time.

While the amplitude of vibrations is constant in the above-described examples shown in FIGS. 5A to 5D, it varies in examples shown in FIGS. 5E to 5J. In the example shown in FIG. 5E, two types of pulses are cyclically applied to give strong and weak vibrations, and conversely, in the example shown in FIG. 5F, two types of pulses are cyclically applied to give weak and strong vibrations. In the example shown in FIG. 5G, three types of pulses are cyclically applied to give strong, weak, and strong vibrations, and conversely, in the example shown in FIG. 5H, three types of pulses are applied to give weak, strong, and weak vibrations. In the example shown in FIG. 5I, the current value is changed to gradually increase the amplitude of the vibrations, and in the example shown in FIG. 5J, the current value is changed to gradually decrease the amplitude. In this way, various vibration modes are provided.

Next, a specific description will be given of a case in which the signal input device of this embodiment is mounted in a car. The keyboard switch 35 includes switches for selecting the operations of car-mounted devices, such as an air conditioner, an audio system, a navigation system, a telephone, and a game.

The operating section X is allowed to take nine positions shown in FIG. 3. In a case in which an air conditioner is selected by the keyboard switch 35, the following functions preset corresponding to the positions of the operating section X are available:

Position No. 0 . . . neutral

Position No. 1 . . . air blow

Position No. 2 . . . horizontal and downward air blow

Position No. 3 . . . increase of air volume

Position No. 4 . . . automatic air conditioning

Position No. 5 . . . defroster (front)

Position No. 6 . . . decrease of air volume

Position No. 7 . . . rear defroster

Position No. 8 . . . horizontal air blow

Moreover, vibration modes shown in FIG. 5 are preset corresponding to the positions. For example, in order to increase the volume of air from the air conditioner, the operating section X is shifted to the position No. 3 shown in FIG. 3. The ground point switch 27 detects the shift position, and outputs a detection signal. Based on the detection signal, the volume of air is adjusted. The increase of volume of air is indicated by the display device 38, and for example, three vibrations are cyclically applied to the hand of the operator by the vibration means 41 (the vibration head 12 and the solenoid 13), thereby tactually notifying the operator that the operation of increasing the volume of air has been selected. The shift position of the operating section X is determined by one push of the switch cap 8 shown in FIG. 1, and the decision is canceled by two pushes of the switch cap 8. The temperature control in the air conditioner is executed by turning the rotary knob 6.

In a case in which an audio system is selected by the keyboard switch 35, the following preset functions are available:

Position No. 0 . . . neutral

Position No. 1 . . . switching between AM/FM

Position No. 2 . . . selection of Station 1

Position No. 3 . . . AM

Position No. 4 . . . selection of Station 2

Position No. 5 . . . selection of Station 3

Position No. 6 . . . FM

Position No. 7 . . . selection of Station 4

Position No. 8 . . . selection of Station 5

Moreover, vibration modes are preset corresponding to the positions, as shown in FIG. 5. The volume control is executed by turning the rotary knob 6.

While the vibration means is used as the indication means for the operator in this embodiment, a sound producing means, such as a speaker, which produces different sounds, melodies, voices, or the like, may be used instead.

Furthermore, the vibration means and the sound producing means may be used in combination.

While the function (device) to be operated is selected through the keyboard switch in this embodiment, the functions (devices) may be switched and controlled by switches provided in the operating section.

While the car-mounted signal input device has been described in this embodiment, the present invention is not limited to the above embodiment, and is applicable to various kinds of devices, for example, other vehicles such as an airplane and a ship, a crane, measuring equipment, and precision equipment.

Figure 6:
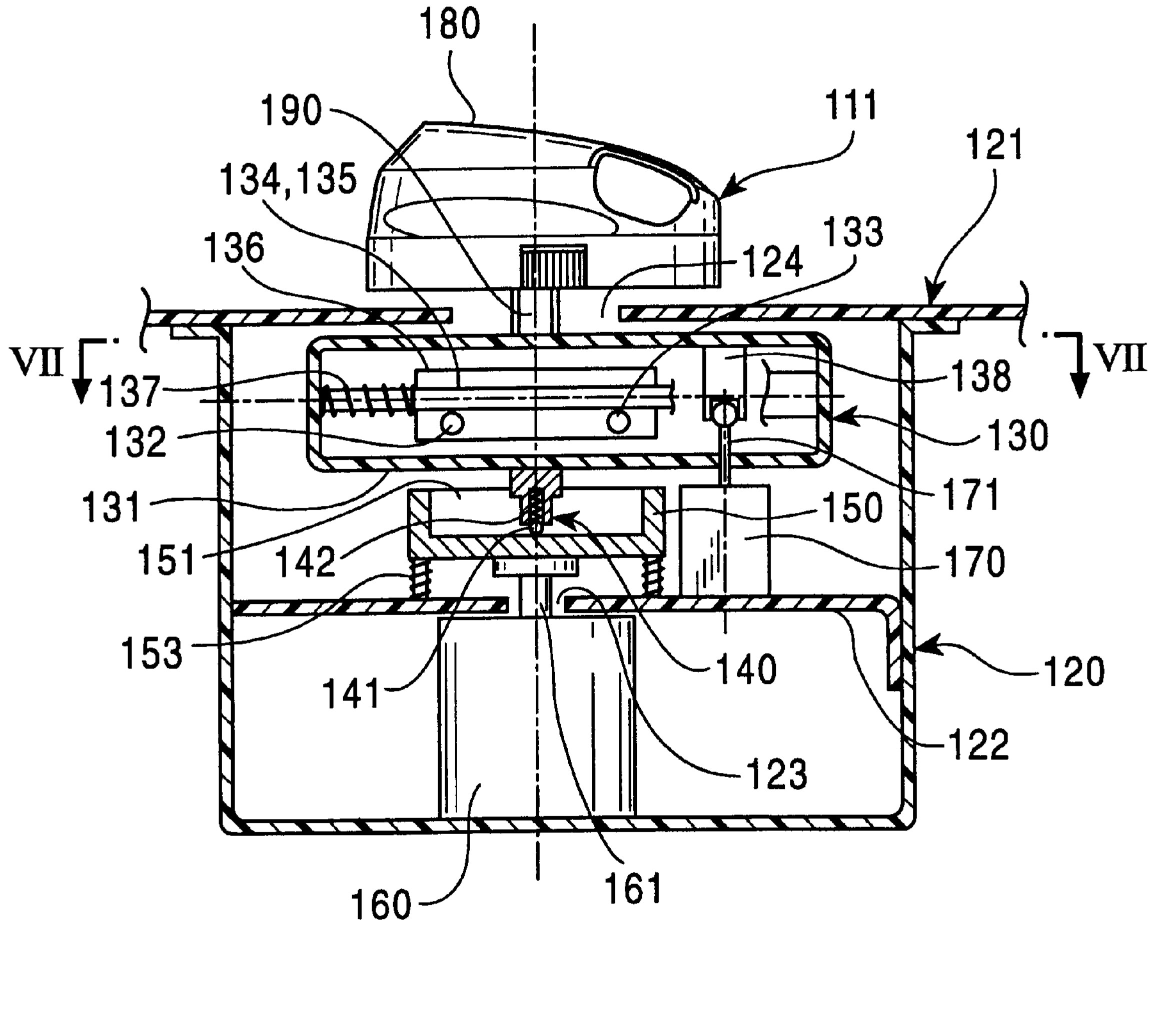
FIG. 6 is a cross-sectional view showing the principal part of a car-mounted input device according to a second embodiment of the present invention.
Figure 8:
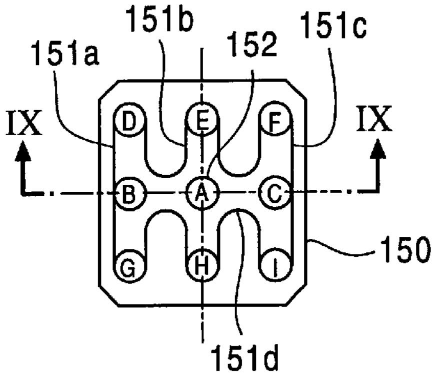
FIG. 8 is a plan view of a guide plate in the car-mounted input device.
Figure 9:
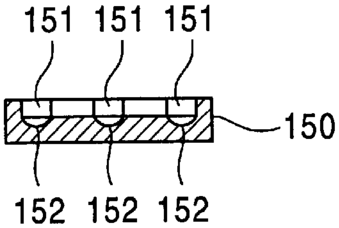
FIG. 9 is a sectional view taken along line IX—IX of FIG. 8.
Figure 10:
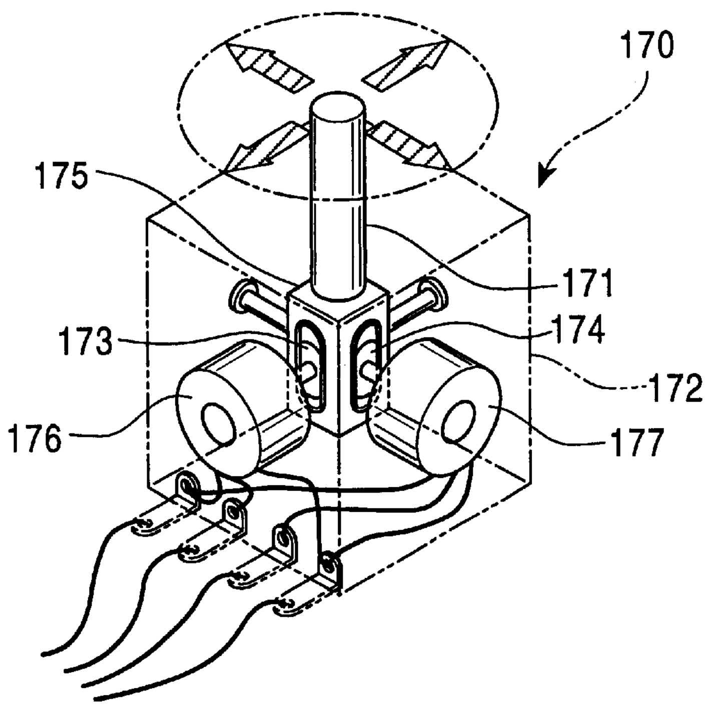
FIG. 10 is a structural view of a stick controller.
Figure 11:
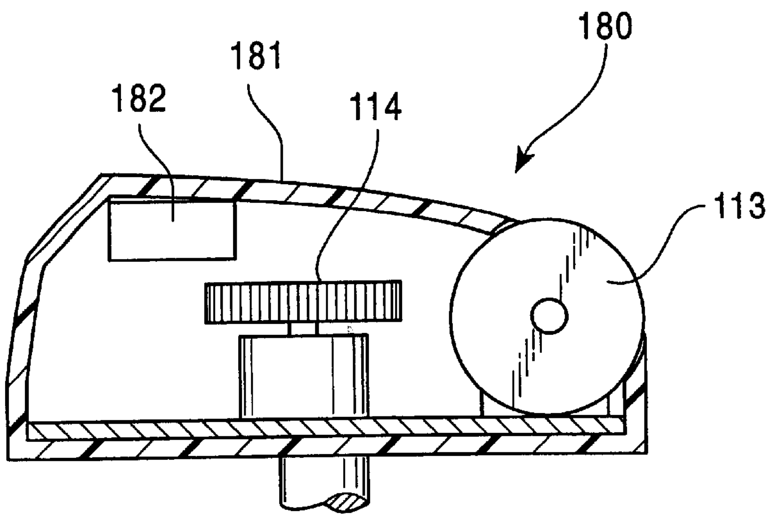
FIG. 11 is a sectional view showing the principal part of a manual operating section.
Figure 12:
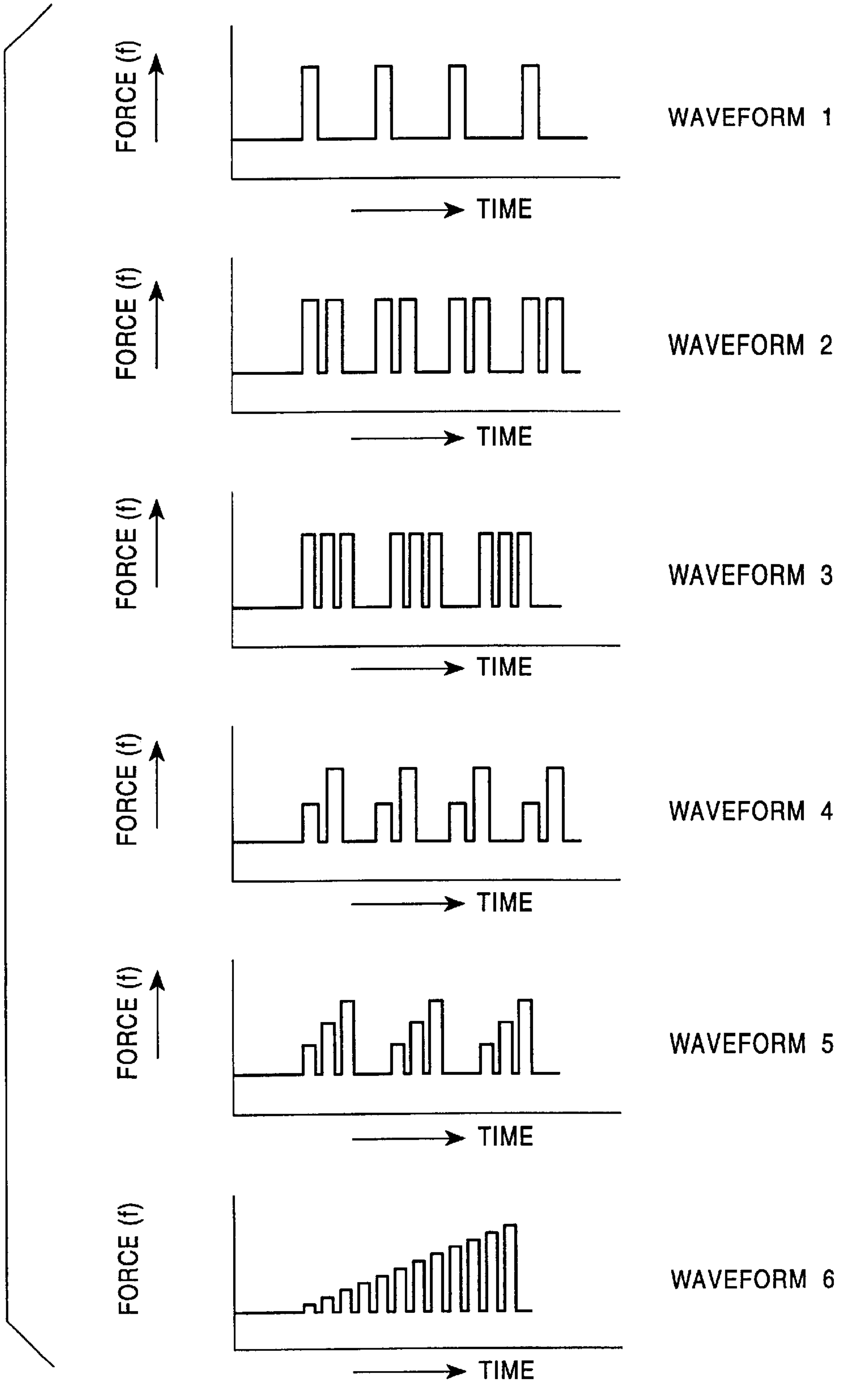
FIG. 12 is a waveform chart illustrating modes of vibrations to be applied to the manual operating section.

Next, a car-mounted input device according to a second embodiment of the present invention will be described with reference to FIGS. 6 to 12. FIG. 6 is a sectional view showing the principal part of a car-mounted input device according to a second embodiment of the present invention, FIG. 7 is a sectional view taken along line VII—VII of FIG. 6, FIG. 8 is a plan view of a guide plate in the second embodiment, FIG. 9 is a sectional view taken along line IX—IX of FIG. 8, FIG. 10 is a structural view of a stick controller, FIG. 11 is a sectional view showing the principal part of a manual operating section, and FIG. 12 is a waveform chart illustrating modes of vibrations to be given to the manual operating section.

Referring to FIG. 6, a car-mounted input device 111 of the second embodiment comprises a housing 120 for holding a working part of the car-mounted input device 111 therein, a panel 121 disposed on the open side of the housing 120, an X-Y table 130, an engaging pin 140, a guide plate 150 serving as a guide means, a solenoid 160 serving as a guide plate driving means, a stick controller 170 serving as a position signal input means, and a manual operating section 180. Other members or elements, which are equivalent to those in the first embodiment are denoted by the same numerals as above.

Figure 7:
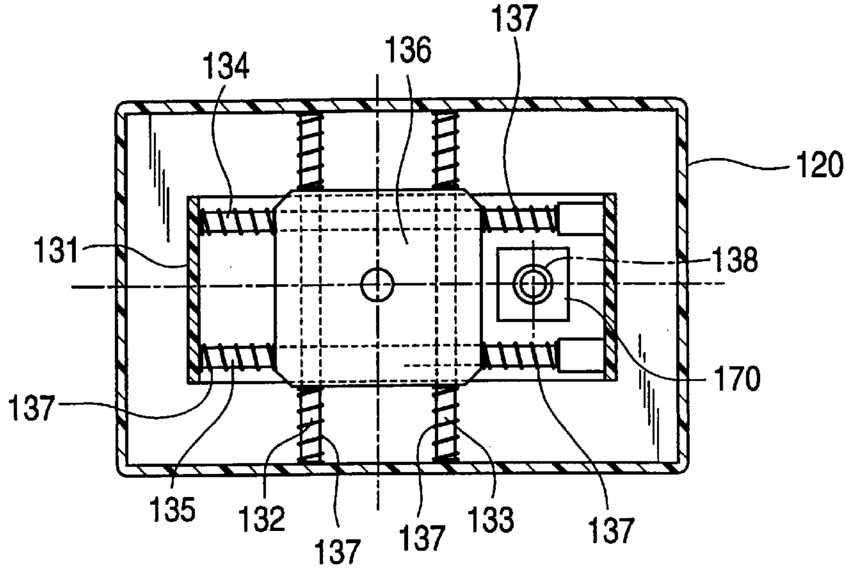
FIG. 7 is a sectional view taken along line VII—VII of FIG. 6.

The housing 120 is shaped like a rectangular cylinder so as to contain the X-Y table 130, the engaging pin 140, the guide plate 150, the solenoid 160, and the stick controller 170 therein, as shown in FIGS. 6 and 7. Inside the housing 120, a partition plate 122 is provided to hold the guide plate 150 and the stick controller 170, and has a through hole 123 through which a drive shaft 161 of the solenoid 160 penetrates. The panel 121 disposed on the open side of the housing 120 has a through hole 124 through which a connecting shaft 190 for connecting the manual operating section 180 and the X-Y table 130 penetrates.

The X-Y table 130 comprises, as shown in FIGS. 6 and 7, a loop-shaped slider 131 connected to the manual operating section 180 via the connecting shaft 190, two X-direction guide rods 132 and 133, two Y-direction guide rods 134 and 135, a slider block 136 placed inside the slider 131 so as to movably hold the slider 131 in the X- and Y-directions via the guide rods 132 to 135, springs 137 serving as a center return mechanism that always urge the slider 131 in a direction such that the center of the slider 131 is aligned with the center of the slider block 136, and a connecting portion 138 for operating a control lever 171 of the stick controller 170.

The X-direction guide rods 132 and 133 slidably penetrate through two through holes formed in parallel at a predetermined interval in a first side face of the slider block 136, and both ends thereof are held on two opposing faces of the housing 110, as shown in FIG. 7. In contrast, the two Y-direction guide rods 134 and 135 slidably penetrate through two through holes formed in parallel at a predetermined interval in a second side wall of the slider block 136 orthogonal to the first side wall, and both ends thereof are held on two opposing faces of the slider 131, as shown in FIGS. 6 and 7. Therefore, the slider 131 is allowed to freely move relative to the slider block 136 in both the X-direction (the direction along the X-direction guide rods 132 and 133) and the Y-direction (the direction along the Y-direction guide rods 134 and 135).

The engaging pin 140 is mounted on the center of the lower surface of the slider 131 so as to point down. At the leading end of the engaging pin 140, a small-diameter ball 141 is held to vertically move, and is always urged downward by a spring 142 provided in the engaging pin 140. A part of the small-diameter ball 141 is placed to project downward from the leading end of the engaging pin 142, and is in elastic contact with the bottom face of a guide groove 151 cut in the guide plate 150.

As shown in FIG. 8, the guide groove 151 cut in the upper surface of the guide plate 150 includes three longitudinal grooves 151*a,* 151*b,* and 151*c,* and a lateral groove 151*d* for connecting the centers of these three longitudinal grooves 151*a,* 151*b,* and 151*c.* On the lower faces at the ends and centers of the grooves 151*a* to 151*d,* shallow recesses 152 are formed in the shape of an arc. The guide plate 150 is mounted on the upper surface of the partition plate 122 so as to vertically move, and is connected to the drive shaft 161 of the solenoid 160, as shown in FIG. 6. Between the guide plate 150 and the upper surface of the partition plate 122, springs 153 are interposed to always urge the guide plate 150 upward. Therefore, the guide plate 150 is always urged upward by elasticity of the springs 153 when the solenoid 160 is not energized, and is moved downward by the attracting force of the solenoid 160 when the solenoid 160 is energized.

The height of the guide plate 150 in the off-state of the solenoid 160 is set so that the engaging pin 140 can engage with the guide groove 151 and so that the small-diameter ball 141 at the leading end of the engaging pin 140 can be in elastic contact with the bottom face of the guide groove 151 by elastic force of the spring 142. In contrast, the height of the guide plate 150 in the on-state of the solenoid 160 is set so that the guide groove 151 and the engaging pin 140 can be disengaged from each other.

The stick controller 170 is mounted on the partition plate 122, and the control lever 171 thereof is pivotally connected to the connecting portion 138 of the slider 131 in the X-Y table 130. While a well-known arbitrary stick controller may be used as the stick controller 170, it is most preferable that the stick controller 170 comprise the control lever 171 pivotally mounted on a casing 172, a converting portion 175 for converting the tilting angle and tilting direction of the control lever 171 into the amount of rotation of two rotators 173 and 174 placed at right angles, and two rotary variable resistors or encoders 176 and 177 for converting the amount of rotation of the two rotators 173 and 174 into electric signals, as shown in FIG. 10, because of simple structure and high detection accuracy.

The manual operating section 180 includes two click switches (not shown), and three rotary variable resistors (not shown), in a manner similar to the above-described conventional manual operating section 210. As shown in FIG. 11, a vibration device 182 is provided on the inner surface of a casing 181 that forms the manual operating section 180. When the small-diameter ball 141 attached to the engaging pin 140 is fitted in any of the. nine recesses 152 formed in the guide groove 151, and one of the two click switches not shown in the manual operating section 180 is operated, the vibration device 182 generates vibrations specific to the position of the recess 152. The driver can thereby tactually know whether the selected shift position in the guide groove 151 is a desired shift position.

FIG. 12 shows examples of vibration modes in accordance with the shift positions. The vibration modes are switched by a computer provided in a console box of the car in response to a position signal output from the stick controller 170.

While it is most preferable that the vibration device 182 use a solenoid or a piezoelectric element as a drive source, because of simple structure, it may be possible to used a so-called vibrator in which a weight is eccentrically mounted on a motor shaft, a device in which an elastic member made of a ferromagnetic material and having a weight at the leading end thereof is excited by an electromagnet, or the like. While the vibration device 182 is directly mounted on the casing of the manual operating section 180 in the embodiment shown in FIG. 11, it may be mounted on a vibration plate provided inside the casing, which can transmit great vibrations to the driver by using a small vibration device.

In a manner similar to the conventional car-mounted input device 200, the car-mounted input device 111 of this embodiment also serves required functions in combination with a switch device for alternatively selecting a desired electronic device from a plurality of electronic devices mounted in a car, a display device for displaying the name of the selected electronic device, and details of the operation of the car-mounted input device 111, and a computer provided in a console box.

Next, a description will be given of the operation of the car-mounted input device 111 of this embodiment having the above-described configuration.

In the car-mounted input device 111 of this embodiment, it is possible to engage and disengage the guide groove 151 and the engaging pin 140 by switching between energization and de-energization of the solenoid 160. That is, when the solenoid 160 is not energized, the guide plate 150 is moved up by elasticity of the springs 153, so that the engaging pin 140 is engaged with the guide groove 151. In this case, it is possible to select the functions of the car-mounted electronic devices and to adjust the selected function, in a manner similar to the conventional car-mounted input device 200. In the car-mounted input device 111 of this embodiment, the nine recesses 152 are formed at the ends and centers of the grooves 151*a* to 151*d* that constitute the guide groove 151, and the small-diameter ball 141 is retractably placed at the leading end of the engaging pin 140. Therefore, when the contact position of the engaging pin 140 with the guide groove 151 is shifted by operating the manual operating section 180, every time the ball 141 engages with a recess 152, a tactile feeling can be given to the driver. As a result, it is possible to switch the functions of the electronic devices more easily and more reliably without looking at the car-mounted input device 111, and to reduce faulty function switching due to a misoperation.

Furthermore, since the vibration device 182 is provided in the manual operating section 180 so as to produce vibrations in a mode that varies according to the shift position of the manual operating section 180, the driver feels the vibrations, and can tactually confirm whether the manual operating section 180 has been shifted to a desired shift position. This makes it possible to reduce erroneous shifting operations of the manual operating section 180, and thereby misoperations of the electronic devices.

In contrast, when the solenoid 160. is switched to an on-state, the drive shaft 161 thereof is attracted downward, and the guide plate 150 descends against the elastic force of the springs 153. Therefore, the guide groove 151 and the engaging pin 140 are disengaged, and the manual operating section 180 can freely move within the working range of the X-Y table 130 without being constrained by the guide groove 151. Accordingly, for example, when a navigation system, a personal computer, or a game machine is used, a cursor displayed on a display can be moved using the manual operating section 180.

In order to use the manual operating section 180 of the car-mounted input device 111 again to switch among the functions of the car-mounted electronic devices after the use of the personal computer or the like is completed, it is only necessary to move the hand off the manual operating section 180 and to de-energize the solenoid 160. Since the X-Y table 130 includes the springs 137 that serve as the center return mechanism, it is automatically returned to the center position by moving the hand off the manual operating section 180, and the engaging pin 140 mounted on the X-Y table 130 moves to the center of the guide groove 151, that is, the portion facing the switch position E. Therefore, even when the solenoid 160 is de-energized and the guide plate 150 is moved up by elasticity of the springs 153, the engaging pin 140 and the guide plate 150 do not collide with each other, which facilitates switching among the modes of the-manual operating section 180.

The main point of the present invention is in that the manual operating section 180 is provided with the vibration device 181, and other structures may be appropriately omitted or added as necessary.

For example, in the above embodiment, while the nine recesses 152 are formed at the ends and centers of the grooves 151*a* to 151*d*, which constitute the guide groove 151, and the small-diameter ball 141 is retractably mounted at the leading end of the engaging pin 140 in order to give a tactile feeling to the driver in operating the manual operating section 180, such a structure may be omitted.

While the manual operating section 180 and the stick controller 170 are indirectly connected via the X-Y table 130 in the above embodiment, they may be, of course, connected directly. Instead of the X-Y table 130, another movable member may be interposed between the manual operating section 180 and the stick controller 170.

In addition, while the solenoid 160 is used as the guide plate driving means in the above embodiment, the present invention is not limited to the above embodiment, and it may be possible to use a motor and a power transmission mechanism for converting the rotating force of the motor into the moving force in the vertical direction.

The car-mounted input device of the second embodiment having the above configuration achieves a small number of component, simple configuration, low cost, and simple assembly, compared with the conventional input devices.

Figure 13:
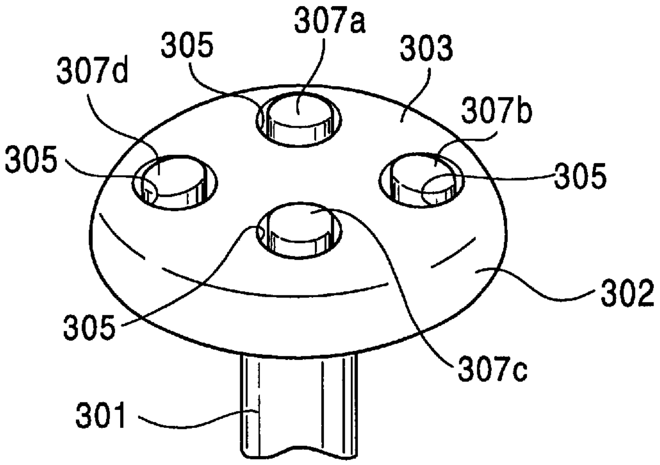
FIG. 13 is a perspective view of a signal input device according to a third embodiment of the present invention.
Figure 14:
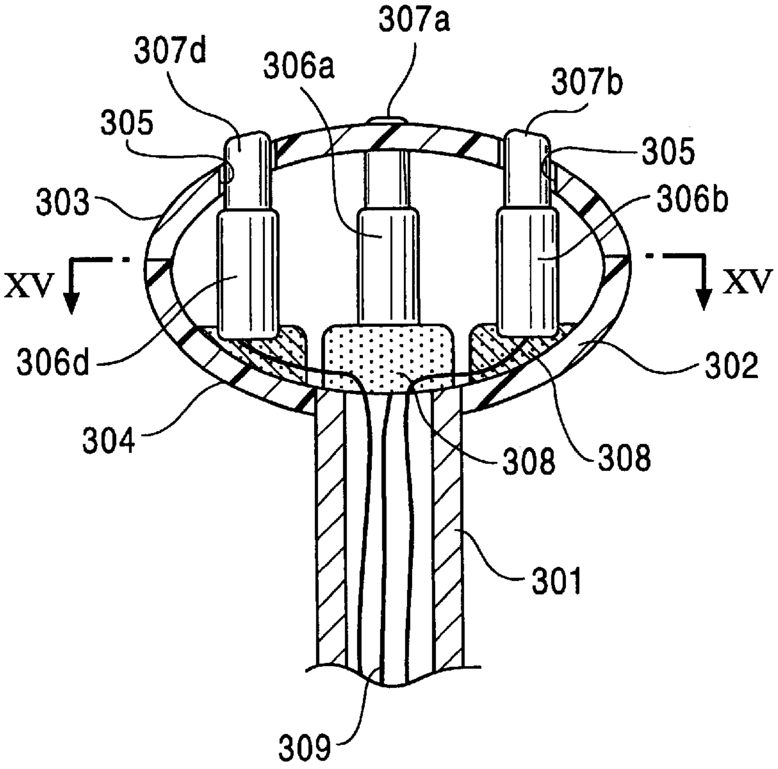
FIG. 14 is a sectional view of the signal input device.
Figure 15:
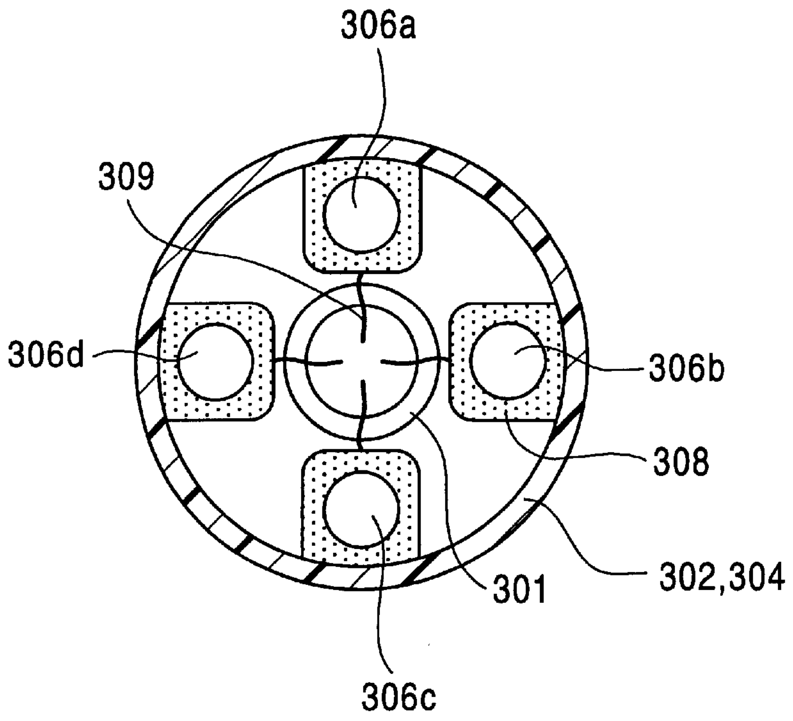
FIG. 15 is a sectional view taken along line XV—XV of FIG. 14.
Figure 16:
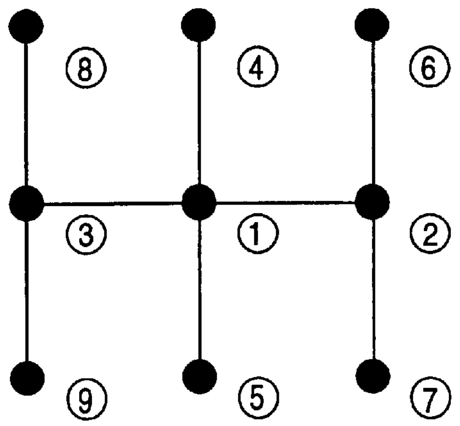
FIG. 16 is an explanatory diagram showing the neutral position and tilting positions of a control lever in the signal input device.

Next, a third embodiment of the present invention will be described with reference to the drawings. FIG. 13 is a perspective view of a signal input device according to a third embodiment of the present invention, FIG. 14 is a sectional view of the signal input device, FIG. 15 is a sectional view taken along line XV—XV of FIG. 14, FIG. 16 is an explanatory diagram showing the neutral position and the tilting positions of a control lever in the signal input device, and FIGS. 17A to 17D and 18A to 18D are explanatory diagrams showing examples of vibration point shift modes in the signal input device.

A signal input device of the third embodiment is of a joystick type for use in operating car-mounted devices, such as a car audio system, a car air conditioner, and a car navigation system. A grip portion 302, which has such a size as to be sufficiently held in the hand, is provided at the head of a control lever 301. As shown in FIG. 14, the grip portion 302 having a nearly elliptic cross section is composed of an upper case 303 and a lower case 304, and has a cavity therein.

The upper case 303 has four through holes 305 that are diagonally arranged, as shown in FIG. 13. Vibration ends 307_a_ to 307_d_ of vibration elements 306_a_ to 306_d_ penetrate through the through holes 305, and slightly project from the surface of the grip portion 302. The vibration elements 306_a_ to 306_d_ are small elements that include, for example, a solenoid or a piezoelectric vibrator. As shown in FIG. 14, the vibration elements 306_a_ to 306_d_ are held in the grip portion 302 (the lower case 304 ) via cushioning members 308 made of sponge, foamed resin, felt, or the like. By mounting the vibration elements 306 via the cushioning members 308 in this way, the shift state of the vibration point, which will be described later, can be clearly distinguished. Wires 309 extending from the vibration elements 306_a_ to 306_d_ are passed through a cavity in the control lever 301 to be connected to a battery (not shown) mounted in a car.

The control lever 301 is tiltably supported in the body of a car. FIG. 16 shows the neutral position and the tilting positions of the control lever 301 that are preset.

In FIG. 16, Position 1 serves as the neutral position of the control lever 301, and Positions 2 to 9 serve as tilting positions. For example, in order to shift the control lever 301 from the neutral position 1 to the tilting position 9, the control lever 301 is shifted to Position 9 via Position 3, as shown by a solid line.

A shift position detecting means (not shown), for example, a membrane switch, is provided to detect the tilting position (shift position) of the control lever 301, and a position signal is input from the detecting means to a control section (not shown) for controlling the drive of the vibration elements 306_a_ to 306 d. While the mechanical position detecting means is used in this embodiment, it may be replaced with an optical or magnetic position detecting means.

FIGS. 17A to 17D and 18A to 18D are explanatory diagrams showing examples of vibration point shift modes. In these figures, filled dots represent vibrating vibration ends of the four vibration ends 307_a_ to 307_d,_ which are provided in the grip portion 302, as described above, and blank dots represent vibration ends that are not vibrating.

Figure 17A:
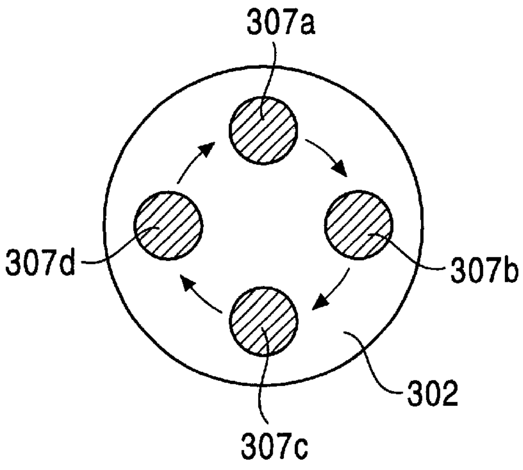
FIGS. 17A to 17D are explanatory diagrams showing vibration point shift modes in the signal input device.

In a mode shown in FIG. 17A, the vibration end 307_a,_ the vibration end 307_b,_ the vibration end 307_c,_ the vibration end 307_d,_ the vibration end 307_a_ . . . vibrate in that order, and therefore, the vibration point circulates clockwise. In a mode shown in FIG. 17B, conversely, the vibration end 307_a,_ the vibration end 307_d,_ the vibration end 307_c,_ and the vibration end 307_b,_ and the vibration end 307_a_ . . . vibrate in that order, and the vibration point circulates counterclockwise. In a mode shown in FIG. 17C, the vibration end 307_a_ and the vibration end 307_c_ alternatively vibrate, and the vibration point moves vertically. In a mode shown in FIG. 17D, the vibration end 307_b_ and the vibration end 307_d_ alternatively vibrate, and the vibration point moves laterally.

Figure 18A:
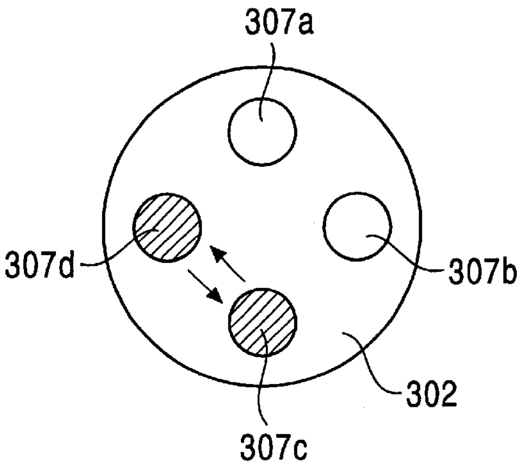
FIGS 18A to 18D are explanatory diagrams showing vibration point shift modes in the signal input device.

In a mode shown in FIG. 18A, the vibration end 307_c_ and the vibration end 307_d_ alternatively vibrate, and the vibration point obliquely moves upward to the left. In a mode shown in FIG. 18B, the vibration end 307_b_ and the vibration end 307_c_ alternatively vibrate, and the vibration point obliquely moves upward to the right. In a mode shown in FIG. 18C, the vibration ends 307_b_ and 307_d_ simultaneously vibrate after the vibration end 307_a_ vibrates, and subsequently, the vibration end 307_a_ vibrates again. This operation is repeated, so that the vibration point is diffused downward from the vibration end 307_a._ In a mode shown in FIG. 18D, the vibration ends 307_b_ and 307_d_ simultaneously vibrate after the vibration end 307_c_ vibrates, and subsequently, the vibration end 307_c_ vibrates again. This operation is repeated, so that the vibration point is diffused upward from the vibration end 307_c._

FIGS. 17A to 17D and 18A to 18D show just the examples of the vibration point shift modes, and other various combinations are possible. While the vibration state (amplitude, speed, and the like) of the vibration elements 306 are constant in this embodiment, it may be variable. In this way, there are different vibrating point shift modes, and the shift of the vibration point can be tactually transmitted to the palm of the hand of the operator that is gripping the grip portion 302 with high precision, regardless of the size of the hand.

Next, a specific description will be given of a case in which the signal input device of this embodiment is mounted in a car. A panel switch (not shown) installed in a car is provided with a group of switches for selecting the operations of car-mounted devices, such as an air conditioner, an audio system, a navigation switch, a telephone, and a game machine.

Figure 17B:
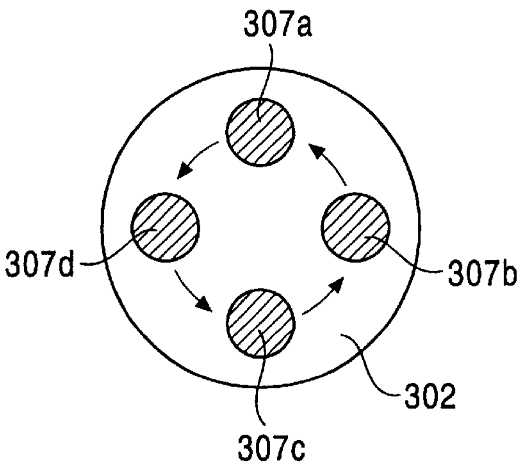
Figure 17C:
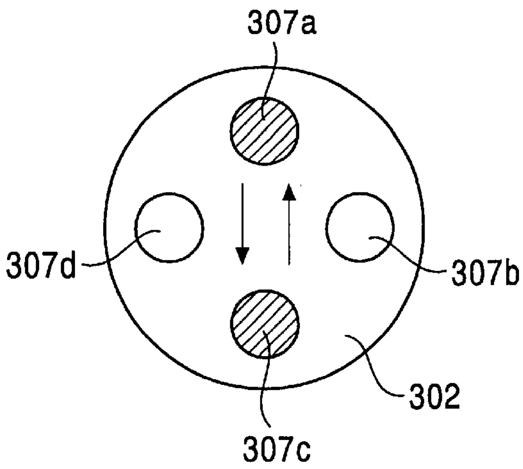
Figure 17D:
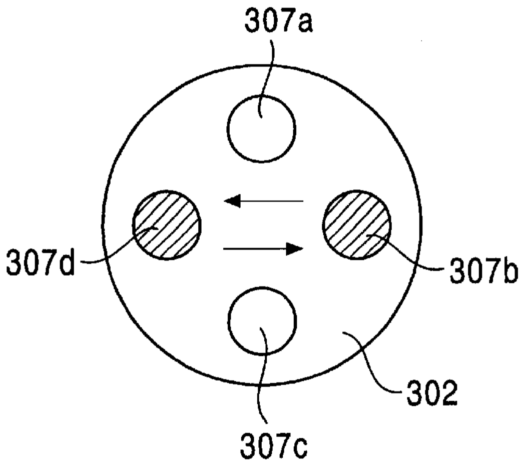
Figure 18B:
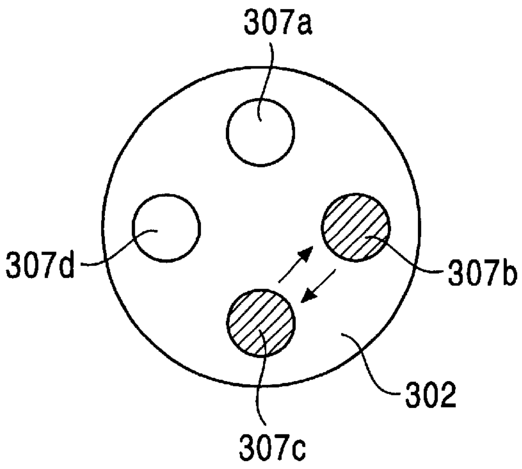
Figure 18C:
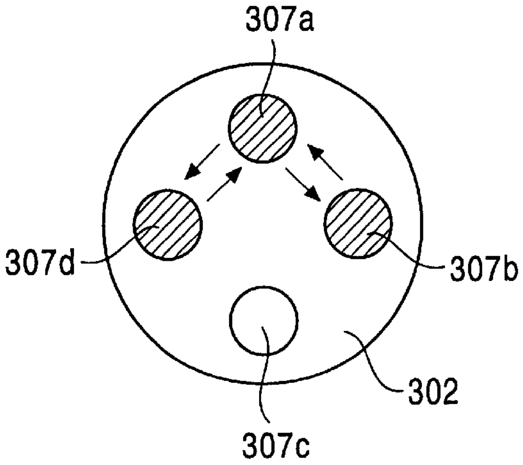
Figure 18D:
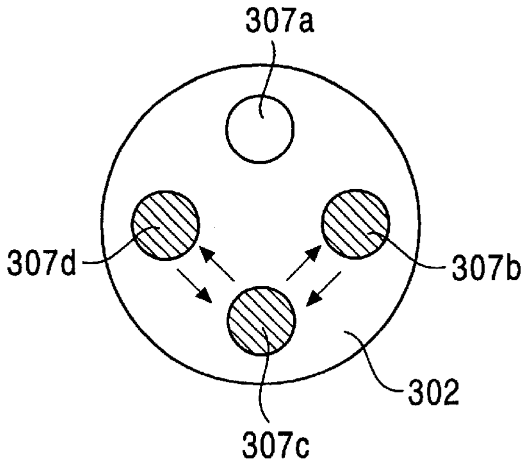
Figure 19:
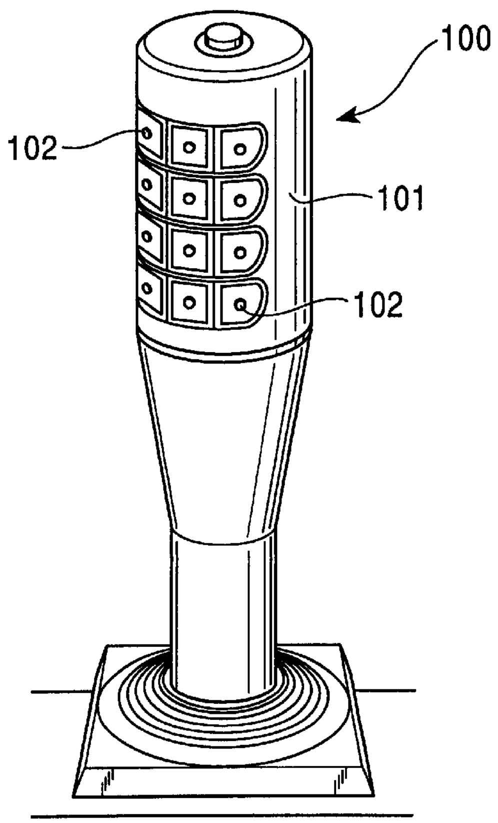
FIG. 19 PRIOR ART
FIG. 19 is a perspective view of a conventional signal input device.
Figure 20:
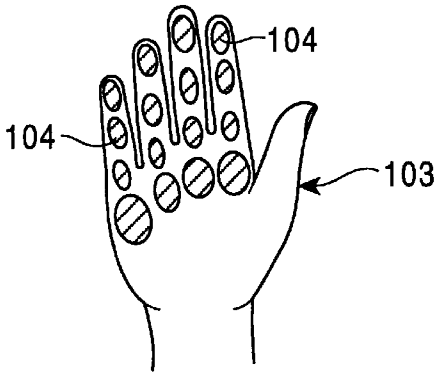
FIG. 20 PRIOR ART
FIG. 20 is a plan view of a hand for operating the signal input device.
Figure 21:
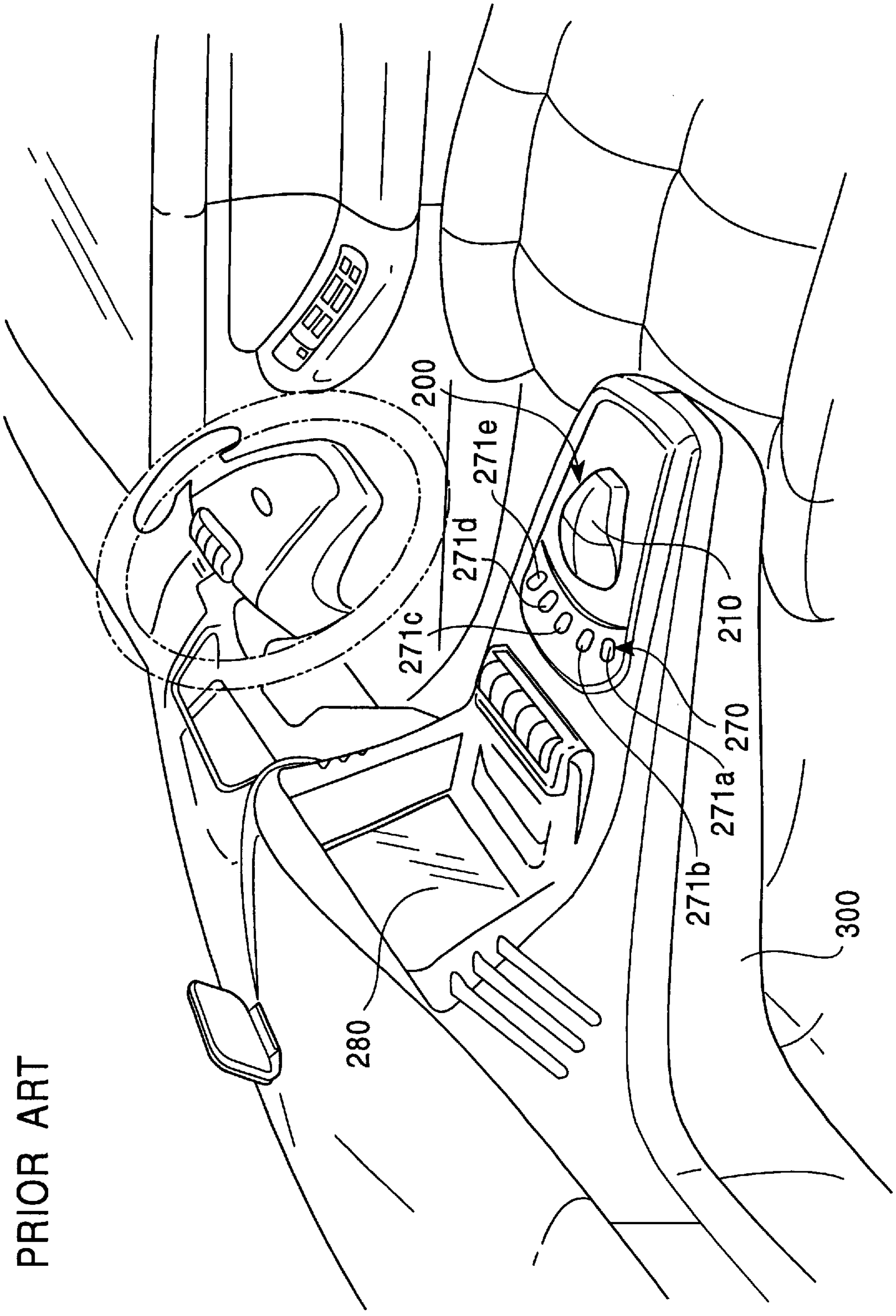
FIG. 21 PRIOR ART
FIG. 21 is an interior view of a car equipped with the car-mounted input device.
Figure 22:
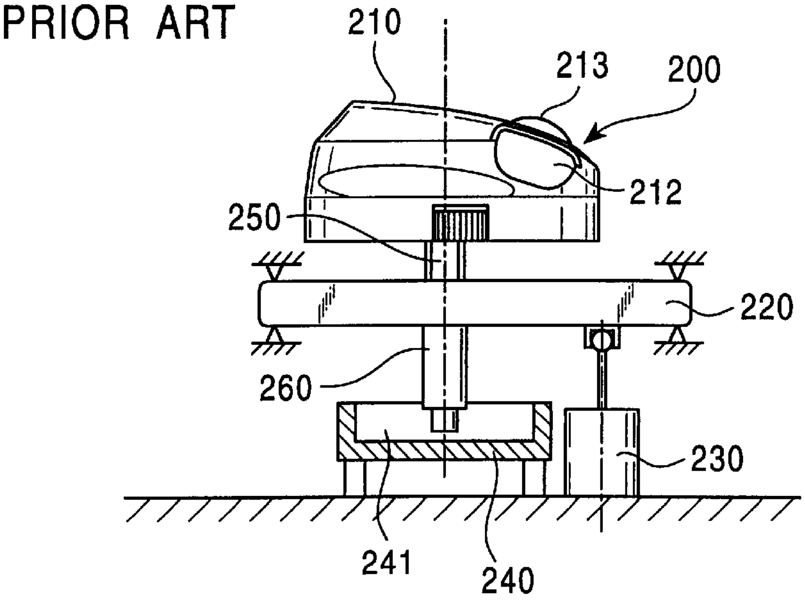
FIG. 22 PRIOR ART
FIG. 22 is a side view of another conventional car-mounted input device.
Figure 23:
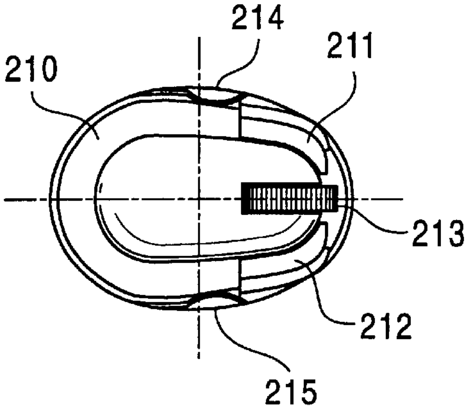
FIG. 23 PRIOR ART
FIG. 23 is a plan view of a manual operating section in the conventional car-mounted input device.
Figure 24:
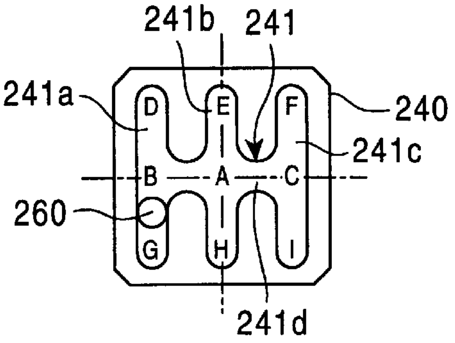
FIG. 24 PRIOR ART
FIG. 24 is a plan view of a guide plate in the conventional car-mounted input device.

As described above, the control lever 301 is allowed to be placed in nine positions shown in FIG. 16. In a case in which the air conditioner is selected by the panel switch, the following preset functions are available:

Position 1 . . . neutral
Position 2 . . . air blow position
Position 3 . . . horizontal and downward air blow
Position 4 . . . increase of air volume
Position 5 . . . automatic air conditioning
Position 6 . . . defroster (front)
Position 7 . . . decrease of air volume
Position 8 . . . rear defroster
Position 9 . . . horizontal air blow Moreover, the following vibration point shift modes are preset corresponding to the positions:

Position 1 . . . no vibration
Position 2 . . . mode in FIG. 17A
Position 3 . . . mode in FIG. 17B
Position 4 . . . mode in FIG. 17C
Position 5 . . . mode in FIG. 17D
Position 6 . . . mode in FIG. 18A
Position 7 . . . mode in FIG. 18B
Position 8 . . . mode in FIG. 18C
Position 9 . . . mode in FIG. 18D For example, in order to increase the volume of air from the air conditioner, the control lever 301 is tilted (shifted) from the neutral position 1 to the position 4 in FIG. 16. The membrane switch detects the shift position, and outputs a detection signal. Based on the detection signal, the volume of air from the air conditioner is adjusted. Simultaneously, the increase of air volume is indicated by a car-mounted display device (not shown), and the vibration end 307_a_ and the vibration end 307_c_ alternatively vibrate in the vibration point shift mode shown in FIG. 17C to give vibrations to the palm of the hand of the operator, thereby notifying that the operation of increasing the air volume has been performed.

In operating the audio system, the relationship among the function, the position of the control lever, and the vibration point shift mode is predetermined, for example, as follows:

| (Function) | (Position of control lever) | (Vibration point shift mode) |
|---|---|---|
| standby | position 1 | no vibration |
| switching between AM/FM | position 2 | mode in FIG. 17A |
| Station 1 | position 3 | mode in FIG. 17B |
| Station 2 | position 4 | mode in FIG. 17C |
| Station 3 | position 5 | mode in FIG. 17D |
| Station 4 | position 6 | mode in FIG. 18A |
| Station 5 | position 7 | mode in FIG. 18B |
| AM | position 8 | mode in FIG. 18C |
| FM | position 9 | mode in FIG. 18D |

While the function (device) to be operated is selected by the panel switch in this embodiment, it may be switched and set by switches provided in the operating section (the control lever 301 or the grip portion 302).

While the operating section of this embodiment is of a lever type that is able to tilt, it may be of a mouse type that can move on a horizontal plane in predetermined directions.

While the signal input device to be mounted in a car has been described in this embodiment, the present invention may be applied to other various devices, for example, other vehicles such as an airplane and a ship, a crane, a measuring device, and a precision device.

According to the present invention, as described above, since the indication means can produce information, such as vibrations or sounds in the mode that varies depending on the shift position signals of the operating section, it is satisfactory that at least one indication means is provided. This makes it possible to reduce the number of components, compared with the conventional devices, and to thereby achieve simple structure, small size, low cost, and simple assembly.

The indication means does not respond to the tip or middle portion of a finger, as is different from before, and, for example, vibrates the entire grip portion of the control lever that serves as the operating section. Therefore, it is possible to precisely grasp the operation by the operating section, regardless of the size of the hand.

By using both the vibration means and the sound producing means as the indication means, the operation by the operating section can be grasped more precisely.

By incorporating the vibration means in the grip portion of the operating section and interposing the vibration absorbing means between the grip portion and the operating shaft, vibrations are not transmitted to the operating shaft, which makes it possible to precisely detect the shift position of the operating section.

The operating section is formed of a control lever that can serve a plurality of functions, and is provided with the function switching means. The amount of the function switched and set by the function switching means can be controlled in accordance with the shift position of the operating section. This makes the operating section multifunctional, and affords greater convenience.

When the operating section is mounted in a car, it is possible to operate car-mounted devices without seeing a display device, which contributes to safe driving.

In the another aspect of the present invention, since the manual operating section is provided with a vibration device so as to produce different vibration modes according to the operating positions of the manual operating section, the driver can tactually know whether the manual operating section has been shifted to a desired operating position. This makes it possible to reduce erroneous switching operations without hindering safety driving of an automobile.

The signal input device of the present invention has the above-described configuration, and achieves a small number of components, simple structure, small size, low cost, and simple assembly, compared with the conventional device.

The placement of the vibration means does not respond to the tip or middle portion of a finger, as is different from the conventional device. Since details of input can be confirmed based on the shift state of the vibration point, regardless of the size of the hand, the operation by the operating section can be grasped precisely.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal input device comprising:

a movable operating section for inputting a desired signal by selecting a shift position thereof;

a shift position detecting means for detecting the shift position of said operating section; and indication means for giving an operator tactile information in different modes based on a shift position signal from said shift position detecting means, the tactile information applied to the operating section.

2. A signal input device according to claim 1, wherein said indication means include s vibration means for giving vibrations to said operating section, and different vibration modes are output from said vibration means.

3. A signal input device according to claim 2, wherein said vibration means is built in a grip portion of said operating section, and a vibration absorbing member is interposed between said grip portion and an operation shaft.

4. A signal input device according to claim 1, said indication means includes sound producing means for producing sound, and different sound modes are output from said sound producing means.

5. A signal input device according to claim 1, wherein said indication means includes vibration means for giving vibrations to said operating section, and sound producing means for producing sound, different vibration modes are output from said vibration means, and different sound modes are output from said sound producing means.

6. A signal input device according to claim 1, wherein said operating section includes a control lever for operating a plurality of functions, and has function switching means, and an amount of operation of the function switched and set by said function switching means is controlled in accordance with the shift position of said control lever.

7. A signal input device according to claim 1, wherein said operating section is mounted in a car so as to operate a car-mounted device.

8. A signal input device to be mounted in a car, comprising:

a manual operating section having at least one signal input means;

position signal input means for inputting a signal in accordance with an operating position of said manual operating section;

guide means for limiting a moving range of said manual operating section; and a vibration device disposed inside said manual operating section to produce vibrations having a mode that varies depending on the operating position of said manual operating section with respect to said guide means.

9. A signal input device comprising:

an operating section to input a signal determined by an operating position of the operating section;

a plurality of vibration means that produces a time-varying vibration mode in accordance with the signal determined by the operating position of said operating section.

10. A signal input device according to claim 9, the operating section further comprising a grip portions, the plurality of vibration elements disposed in the grip portion, the vibration means having vibration ends exposed from said grip portion.

11. A signal input device according to claim 9, wherein said vibration means are mounted via a cushioning member.

12. A signal input device according to claim 9, wherein said operating section is tiltably mounted, and the time-varying vibration mode varies in accordance with the tilting position of said operating section.

13. A signal input device according to claim 9, wherein said operating section controls a plurality of functions and has function switching means to switch between the plurality of functions, and the function switched and set by said function switching means is controlled in accordance with the shift position of said operating section.

14. A signal input device according to claim 9, wherein said operating section is mounted in a car so as to operate a car-mounted device.

15. A signal input device according to claim 10, wherein said vibration means are mounted via a cushioning member.

16. A signal input device comprising:

an operating section adjustable to a plurality of different positions; and a feedback mechanism to convey operational information of the signal input device tactilely to an operator adjusting the position of the operating section via the operating section, the operational information corresponding uniquely to each position of the plurality of different positions and relatable to the operator at each position of the plurality of different positions.

17. The signal input device of claim 16, the feedback mechanism conveying the operational information tactilely through vibrations of a vibration mechanism.

18. The signal input device of claim 17, the vibration mechanism comprising a plurality of vibration elements.

19. The signal input device of claim 18, the operating section comprising a grip portion and a shaft, the vibration elements disposed in the grip portion and vibrations from the vibration elements isolated from the shaft.

20. The signal input device of claim 19, the vibration elements mounted in cushioning members thereby isolating the vibrations of the vibration elements from the shaft.

21. The signal input device of claim 18, the feedback mechanism further comprising varying the vibrations of the plurality of vibration elements to distinguish between each position of the plurality of different positions, the vibrations being varied by one of a number of the vibration elements being vibrated, a sequence of the vibration elements being vibrated, a duration of vibration of individual vibration elements of the vibration elements being vibrated, and an amplitude of vibration of individual vibration elements of the vibration elements being vibrated.

22. The signal input device of claim 17, the vibration mechanism comprising a single vibration element.

23. The signal input device of claim 22, the operating section further comprising a casing having the vibration element mounted thereon.

24. The signal input device of claim 22, the vibration mechanism further comprising a vibration plate having the vibration element mounted thereon.

25. The signal input device of claim 22, the operating section comprising a grip portion and a shaft, vibrations from the vibration element isolated from the shaft.

26. The signal input device of claim 22, the feedback mechanism further comprising varying the vibrations of the vibration element to distinguish between each position of the plurality of different positions, the vibrations being varied by one of a number of repetitions of vibration of the vibration element, a duration of vibration of the vibration element, and an amplitude of vibration of the vibration element.

27. The signal input device of claim 16, the feedback mechanism additionally conveying the operational information sonically.

28. The signal input device of claim 16 further comprising a guide plate having a pattern containing a plurality of set positions corresponding to the plurality of different positions of the operational section, the operational section movable through the pattern of the guide plate.

29. The signal input device of claim 28 further comprising a shift position detector to detect the position of the operating section.

30. The signal input device of claim 29, the shift position detector detecting the position of the operating section mechanically.

31. The signal input device of claim 30, the shift position detector detecting the position of the operating section magnetically.

32. The signal input device of claim 31, the shift position detector detecting the position of the operating section optically.

33. The signal input device of claim 28 further comprising an engagement mechanism to engage the operational section with the guide plate.

34. The signal input device of claim 33, the engagement mechanism adjusting a vertical position of the operational section.

35. The signal input device of claim 33, the engagement mechanism adjusting a position of the guide plate.

36. The signal input device of claim 16, the operational section adjustable continuously adjustable over an operational range.

37. The signal input device of claim 16, the signal input device mounted in a vehicle.

38. The signal input device of claim 16, the signal input device mounted in a measuring device.

39. The signal input device of claim 16, the signal input device mounted in a precision device.

40. The signal input device of claim 16, the plurality of different positions corresponding to a plurality of different functions.

41. A method of providing information safely to an operator of a vehicle, the method comprising:

providing an operating section having a plurality of adjustable positions;

assigning individual positions from the plurality of adjustable positions of the operating section to correspond to a unique function of a plurality of functions;

determining the position of the operating section and thereby the respective function associated with the position of the operating section; and conveying information corresponding to the function associated with the respective position of the operating section to the operating section tactilely when the operator adjusts the position of the operating section.

* * * * *

UNITED STATES PATENT AND TRADEMARK OFFICE

CERTIFICATE OF CORRECTION

PATENT NO. : 6,448,670 B1
DATED : September 10, 2002
INVENTOR(S) : Mikio Onodera et al.

It is certified that error appears in the above-identified patent and that said Letters Patent is hereby corrected as shown below:

Column 16,
Line 2, delete “include s” and substitute -- includes -- in its place.

Column 17,
Line 2, delete “portions,” and substitute -- portion, -- in its place.

Column 18,
Line 2, delete “adjustable” (first occurrence).

Signed and Sealed this

Eighteenth Day of March, 2003

JAMES E. ROGAN
*Director of the United States Patent and Trademark Office*